United States Patent [19]

Gladrow

[11] 4,292,288

[45] Sep. 29, 1981

[54] CATALYST FOR CO REMOVAL FROM FLUE GAS

[75] Inventor: Elroy M. Gladrow, East Baton Rouge, La.

[73] Assignee: Exxon Research & Engineering Co., Florham Park, N.J.

[21] Appl. No.: 843,277

[22] Filed: Oct. 18, 1977

[51] Int. Cl.³ .............................................. B01D 53/36
[52] U.S. Cl. .................................... 423/247; 423/437; 208/113; 208/120; 252/416
[58] Field of Search ................. 423/247, 437; 208/120

[56] References Cited

U.S. PATENT DOCUMENTS 3,364,136  1/1968  Chen et al. ...................... 252/455 Z
4,072,600  2/1978  Schwartz ............................ 208/121

Primary Examiner—Earl C. Thomas
Attorney, Agent, or Firm—James H. Callwood; Edward H. Mazer

[57] ABSTRACT

A method for the removal of CO from flue gas which comprises contacting a spent noble metal reforming catalyst with flue gas from a cat cracker regenerator at 1000°–1350° F. to effectively oxidize CO to $CO_2$. The spent catalyst while no longer efficient in a reforming process is found to be effective in reducing the CO level to a concentration range of 5000 parts per million and less.

4 Claims, No Drawings

CATALYST FOR CO REMOVAL FROM FLUE GAS

BACKGROUND OF THE INVENTION

1. Field of the Invention

This invention relates to the use of a catalyst composition in the catalytic conversion of CO to $CO_2$. More particularly the invention is concerned with a process for reducing the CO level of effluent gases from the regeneration of a cracking catalyst by contacting them with a spent noble metal reforming catalyst.

2. Description of the Prior Art

Various processes such as cracking, hydrocracking, etc. are known for the conversion of hydrocarbons to lower molecular weight products. The catalytic cracking of heavy petroleum fractions is one of the major refining operations employed in the conversion of crude petroleum oils to desirable fuel products such as heating oils and high octane gasoline. Illustrative of "fluid" catalytic conversion processes is the fluid catalytic cracking process wherein suitable preheated high molecular weight hydrocarbon liquids and vapors are contacted with hot finely divided, solid catalyst particles, either in a fluidized bed reactor or in an elongated riser reactor and maintained at an elevated temperature in the fluidized or dispersed state for a period of time sufficient to effect the desired degree of cracking to lower molecular weight hydrocarbons.

In the catalytic process some non-volatile carbonaceous material or "coke" is deposited on the catalyst particles. As coke builds up on the catalyst, the activity of the catalyst for cracking and the selectivity of the catalyst for producing desirable products diminish. The catalyst particles may recover a major proportion of their original activity by removal of most of the coke by a suitable regeneration process. The catalyst regeneration is accomplished by burning the coke deposits from the catalyst surface with an oxygen-containing gas such as air. Many regeneration techniques are practiced commercially whereby a significant restoration of catalyst activity is achieved. The burning of coke deposits from the catalysts requires a large volume of oxygen or air and produces substantial quantities of CO and $CO_2$. Ordinarily the regeneration is conducted at a temperature ranging from about 1050° to about 1250° F. The effect of any increase in temperature is reflected in an increased rate of combustion of carbon and the more complete removal of carbon or coke from the catalyst particles.

A major problem often encountered in the practice of fluid catalyst regeneration is the phenomenon known as "after burning" which is descriptive of the further combustion of CO to $CO_2$. The operators of fluid catalyst regenerators avoid after burning because it could lead to very high temperatures which are damaging to equipment and possibly to the catalyst particles.

More recently, as operators have sought to raise regenerator temperatures for various reasons, elaborate arrangements have also been developed for control of regenerator temperatures at the point of incipient after burning by suitable means for control of the oxygen supplied to the regenerator. However, with the control of after burning the flue gas from catalyst regenerators usually contains very little oxygen and a substantial quantity of CO and $CO_2$. In order to substantially eliminate the CO from the flue gas and to recover heat energy from the combustion of CO to $CO_2$, the regenerator flue gas is generally sent to a CO boiler wherein the combustion of CO is performed.

There has appeared in the literature, e.g., U.S. Pat. Nos. 2,382,382 and 3,563,911, various techniques for substantially eliminating both uncontrolled after burning and the presence of CO in the regenerator effluent flue gas. These techniques generally involve the use of relatively high regeneration temperatures, e.g., 1275° to 1400° F., and the presence of relatively high concentrations of $O_2$ in the regenerator so that there is substantially complete combustion of the spent catalyst coke to $CO_2$ in the regeneration vessel.

It has also been disclosed in the literature, e.g., U.S. Pat. Nos. 2,414,002, 2,436,927, 2,647,860, 3,650,990, 3,788,977 and Netherlands Pat. No. 7,412,423, that the presence of CO in the regenerator effluent gas from a catalytic cracking operation can be substantially reduced by incorporating a small amount of CO oxidation promoter in the cracking catalyst composition. For example, cracking catalyst composites consisting of a crystalline aluminosilicate zeolite in a silica-alumina matrix and a small amount of platinum or palladium are known to yield relatively small amounts of CO in the flue gas during the regeneration thereof.

In accordance with the present invention, it has been found that small amounts of spent noble metal reforming catalyst situated downstream from a cracking catalyst regeneration zone can be effectively utilized to catalyze the combustion of CO to $CO_2$. This will provide a new use for a spent catalyst which otherwise would have no catalytic use. The invention also eliminates the potential deleterious catalytic effects of the noble metals in a cracking environment (e.g., high coke means, high $H_2$ yields, etc.). Further, the noble metal on the spent noble metal reforming catalyst used in the present invention as a CO oxidation promoter can be recovered chemically and re-used. When dispersed on the cracking catalyst as in prior art disclosures, the noble metal cannot be recovered for re-use economically.

SUMMARY OF THE INVENTION

A process for reducing the level of CO in the effluent flue gas from the regeneration of a cracking catalyst, which comprises contacting said effluent flue gas with a spent noble metal containing reforming catalyst to oxidize CO to $CO_2$, said catalyst having been previously used in a reforming process and comprising from 0.1 to 1.0% of a noble metal selected from the group consisting of platinum, palladium, iridium, rhodium, rhenium and mixtures thereof.

DETAILED DESCRIPTION OF THE INVENTION

The catalyst of the invention comprises 0.1 to 1.0% of a noble metal or a compound thereof on a porous refractory inorganic oxide base which promotes the combustion of CO to $CO_2$ under conditions which are employed in a zone situated downstream from a regeneration zone. The metal component of the catalyst may additionally be comprised of bimetallic admixtures such as platinum/tin, platinum/rhenium, platinum/iridium, and others which are known to catalyze the combustion of CO to $CO_2$. The aforedescribed metals may also be present in the state of an oxide, sulfide, or other.

The essential feature of the catalyst of the invention is that it is a spent noble metal reforming catalyst containing 0.1 to 1.0% noble metal. Such catalysts while no longer efficient in a reforming operation have been found to contain effective amounts of noble metals to catalyze the oxidation of CO to $CO_2$ in the effluent flue gas. Such spent catalysts would ordinarily be discarded and chemically treated to recover the precious metals therefrom. In the process of the present invention, the spent catalyst is further used to catalyze the oxidation of CO to $CO_2$ prior to its return to the manufacture for recovery of the precious metals therefrom.

The inorganic porous oxide which is used as the matrix in the original reforming catalyst should be substantially refractory at the temperature and pressure conditions utilized in any given hydrocarbon conversion process. Useful support materials include (a) silicon-based materials such as silica or silica gel, silicon carbide, clays, natural or synthetic silicates such as kieselguhr, kaolin China clay, Attapulgus clay, etc., (b) ceramic compositions such as crushed porcelain or firebrick, (c) aluminosilicate zeolite materials such as naturally occurring or synthetic erionite, mordenite, faujasite, etc., that may or may not have been converted previously to a hydrogen or ammonium form or reduced in soda content by virtue of an exchange with various metal ions including rare earth metal cations, (d) refractory inorganic oxides including alumina, titanium dioxide, zinc oxide, magnesia, thoria, chromia, silica-alumina, alumina-titania, silica-zirconia, alumina-chromia, etc., and (e) mixtures of one or more of the materials referred to above.

Refractory inorganic oxide materials are the preferred catalyst support materials. In general, superior results are obtained with alumina-containing compositions. Alumina is the preferred support for use in reforming catalyts. The support materials described above are known articles of commerce and can be prepared for use in catalyst compositions by many varied techniques. Typically, the support materials are used in the form of spheres, granules, powders, extrudates or pellets, etc. The precise size or shape of the support material used is dependent upon many engineering factors not within the purview of the instant invention.

In addition to the noble metal and matrix components other catalyst constituents of the original reforming catalysts may comprise up to about 2 weight percent sulfur analyzed as sulfate and up to about 1.5 weight percent chlorine.

The noble metal component of the original reforming catalyst exists as the chloride or oxide as made but is reduced essentially to the elemental form by reducing with hydrogen in the reforming unit. In use the catalyst is contacted with small amounts of sulfur in the feed and is converted to the sulfide form. In cyclic operation the sulfide can be converted to both the sulfate and oxide forms of the metal. In time, the catalyst deactivates to a level no longer suitable for reforming, and this spent catalyst is removed from the reformer and replaced with fresh catalyst. The spent noble metal reforming catalyst which has been removed from a commercial reforming operation after its performance has declined below an acceptable minimum level comprises from 0.1 to 1.0 percent noble metal agglomerated as large crystals, sulfur sufficient to analyze about 20 percent (as sulfate) and a small amount of chlorine, i.e. less than 1.5 percent chlorine.

In the process of the claimed invention, the effluent flue gas from the regeneration zone is contacted at temperatures ranging from 1,000° to 1,350° F. Preferably, 1,115° F. to 1,250° F. with the spent noble metal reforming catalyst. Additional air may be injected if needed. Two or more beds of reforming catalysts may be connected in parallel and operated in "swing" fashion, i.e. one bed can be operated while another bed is being either $Cl_2$ treated to redisperse the noble metal or the catalyst is replaced with another charge of used reforming catalyst. The process of the claimed invention is illustrated by reference to the following preferred embodiment.

DESCRIPTION OF THE PREFERRED EMBODIMENT

EXAMPLE 1

A well used platinum-containing reforming catalyst was removed from a commercial reforming operation after its performance had declined below an acceptable minimum level. The original catalyst was a reforming catalyst sold under the trade name PHF-4 by American Cyanamid Company and was originally comprised of 0.3% platinum on an alumina support with a chlorine content of about 0.9 weight percent. The rejected spent catalyst was essentially devoid of chlorine. Most of the platinum was agglomerated in large crystals and enough sulfur was picked up during use to analyze about 1.0% sulfur (as sulfate). This catalyst was no longer usable for reforming and was essentially ready to be chemically destroyed to recover the platinum for reuse. The catalyst was in the form of 1/16 inch extruded pellets. The spent catalyst was tested for its ability to oxidize CO to $CO_2$ as present in a cat cracker regenerator flue gas.

In the test, 10 grams of the spent PHF-4 pellets were placed in a reactor which was heated to 1150° F. and flushed with nitrogen for 10 minutes at 1150° F. at a rate of 250 cc. per minute. A simulated regenerator flue gas containing a small stoichiometric excess of oxygen was then fed into the reactor and passed over the spent PHF-4 catalyst at the rate of 250 cc/min. for 8 minutes with the effluent product gas passing continuously through a 25 cc volume gas sample bomb connected in series. At the end of that time the gas passing through the bomb was sealed off and analyzed for content by mass spectroscopy. The feed gas was analyzed similarly. The following results were obtained:

|  | Feed Gas, Mole % | Product Gas, Mole % |
| --- | --- | --- |
| $O_2$ | 3.40 | 0.00 |
| CO | 8.37 | 0.00 |
| $CO_2$ | 12.07 | 20.92 |
| $N_2$ | 75.87 | 78.72 |
| Other | 0.29 | 0.36 |

Catalyst life is indefinite, i.e. the catalyst will continue to function effectively as a CO oxidation catalyst as long as enough "active" metal is present. This minimum active metal level appears to be in the range of 5–15 ppm noble metal/gram of total catalyst. Thus a reforming catalyst originally containing 0.1–1.0% noble metal would be expected to have a long but indefinite life as a CO oxidation promoter in the method of this invention. If desired, the catalyst can be chlorine treated to redisperse the noble metal to any desired degree and rejuvenate the catalyst for further service as a CO oxidation promoter.

It is seen from the above results that the spent catalyst while ineffective for reforming is very effective for reducing the level of CO in the effluent flue gas from a cat cracker regenerator. In accordance with the invention similar performance as CO oxidation promoter catalyst would be obtained from spent commercial reforming catalyst comprising, for example, platinum with rhenium, and/or irridium.

What is claimed is:

1. A process for reducing the level of CO in the effluent flue gas from the regeneration of a cracking catalyst which comprises contacting said regenerator effluent flue gas with a spent noble metal-containing reforming catalyst at temperatures ranging from 1000° F. to 1350° F. to oxidize CO to $CO_2$, said catalyst comprising from 0.1 to 1.0% of platinum, palladium, iridium, rhodium, rhenium or mixtures thereof.

2. The process of claim 1 wherein said noble metal is platinum.

3. The process of claim 1 wherein said regenerator effluent flue gas is contacted with said spent noble metal reforming catalyst at temperatures ranging from 1115° to 1250° F.

4. A process for reducing the level of CO in the effluent flue gas from the regeneration of a cracking catalyst which comprises contacting said regenerator effluent flue gas with a spent noble metal-containing reforming catalyst at temperatures ranging from 1000° F. to 1350° F. to oxidize CO to $CO_2$, said catalyst comprising from 0.1 to 1.0% of bimetallic mixture selected from the group consisting of platinum/rhenium, platinum/iridium, platinum/tin, platinum/palladium, and platinum/rhodium.

* * * * *